3,574,746
N-(CYCLOALKEN-1-YL) ALPHA-
HALOACETAMIDES
John P. Chupp, Kirkwood, Mo., assignor to Monsanto
Company, St. Louis, Mo.
No Drawing. Continuation-in-part of application Ser. No.
523,870, Feb. 1, 1966. This application June 5, 1967,
Ser. No. 644,760
Int. Cl. C07c 103/34
U.S. Cl. 260—561
24 Claims

ABSTRACT OF THE DISCLOSURE

Compounds of the formula

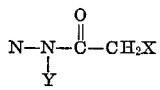

wherein X is halogen (Cl, Br, F and I);
Z is selected from the group consisting of
(I) hydrogen,
(II) $X_n^1R$— wherein R is hydrocarbyl of not more than 18 carbon atoms selected from the group consisting of alkyl, alkenyl and alkynyl, $X^1$ is halogen (Cl, Br, F and I) and $n$ is an integer from 0 to 3 inclusive,
(III) cycloalkyl, alkylcycloalkyl and alkoxycycloalkyl of at least 3 and not more than 8 ring carbon atoms, and not more than 12 chain carbon atoms,
(IV) $R^3O\hspace{-1pt}+\hspace{-1pt}R^2O\hspace{-1pt}+\hspace{-1pt}_mR^1$— wherein $R^1$ is selected from the group consisting of alkylene and alkoxyalkylene of not more than 8 carbon atoms, $R^2$ is alkylene of not more than 4 carbon atoms, $R^3$ is selected from the group consisting of alkyl and alkenyl of not more than 4 carbon atoms and $m$ is an integer from 0 to 1, and
(V) aryl, aralkyl and alkaryl of not more than 18 carbon atoms; and
Y is cycloalkenyl of at least 5 and not more than 7 carbon atoms in the ring selected from the group consisting of

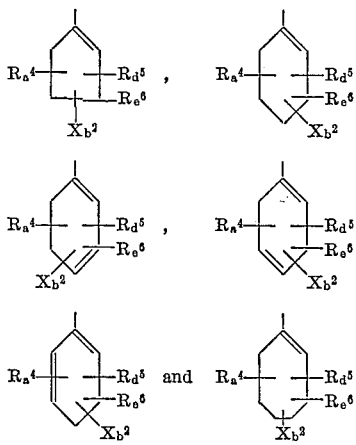

wherein $R^4$ is alkyl of not more than 4 carbon atoms, $R^5$ is alkoxy of not more than 4 carbon atoms, $R^6$ is phenyl, $X^2$ is halogen (Cl, Br, F and I), $a$, $b$ and $d$ are each integers from 0 to 3 inclusive and $e$ is an integer from 0 to 1.
Utility as plant growth regulants.

---

This application is a continuation-in-part of copending application Ser. No. 523,870, filed Feb. 1, 1966, and now abandoned.

This invention relates to novel N-(cycloalken-1-yl) α-haloacetamides which are useful as plant growth regulants, particularly phytotoxicants, and to processes for making them. This invention further relates to plant growth regulant compositions and to methods of modifying the growth of plants.

The term "plant growth regulant" as used herein and in the appended claims means materials having a modifying effect upon the growth of plants. Such modifying effects include all deviations from natural development, for example killing, retardation, defoliation, desiccation, regulation, increased maturation rate, necrosis, leaf curl, terminal inhibition, drawstring effects, chlorosis, stunting, tillering, stooling, stimulation, prolonged dormancy, albinism, delayed senescence, dwarfing and the like.

The term "phytotoxicant" as used herein and in the appended claims means materials which (1) effectively control all plants in a given locus or (2) selectively control the growth of one or more plant species in the presence of other plants. In like manner, "phytotoxic" and "phytotoxicity" are used to identify the overall and selective control activity of the compounds and compositions of this invention.

The term "plant" as used herein and in the appended claims means terrestrial plants and aquatic plants.

The term "terrestrial plant" is inclusive of dormant seeds, germinant seeds, germinative seeds, emerging seedlings and established woody and herbaceous vegetation including the roots and above-ground portions.

The term "aquatic plant" means algae and higher aquatic plants. The term "higher aquatic plant" means aquatic plants which are botanically higher than algae and is inclusive of vegetative organisms growing in water in which a major part of such organisms are normally largely submerged, e.g. roots as in Lemna, leaves as in Vallisneria or entire plants such as Anacharis. Thus the term "higher aquatic plant" is inclusive of all water plants whether normally free floating in their environing water such as Salvinia, or immersed species which are normally rooted in soil such as Vallisneria, as well as species which appear to grow normally in all respects either free-floating or rooted such as Anacharis.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The terms "alkylcycloalkyl" and "alkoxycycloalkyl" as used herein and in the appended claims are inclusive of mono- and polyalkylcycloalkyl and mono- and polyalkoxycycloalkyl, respectively.

The N-(cycloalken-1-yl) α-haloacetamides of this invention are represented by the formula

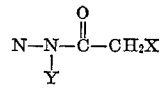

wherein X is halogen (Cl, Br, F and I);
Z is selected from the group consisting of (I) hydrogen,
(II) $X_n^1R$— wherein R is hydrocarbyl of not more than 18 carbon atoms selected from the group consisting of alkyl, alkenyl and alkynyl, $X^1$ is halogen (Cl, Br, F and I) and $n$ is an integer from 0 to 3 inclusive,
(III) cycloalkyl, alkylcycloalkyl and alkoxycycloalkyl of at least 3 and not more than 8 ring carbon atoms, and not more than 12 chain carbon atoms
(IV) $R^3O\hspace{-1pt}+\hspace{-1pt}R^2O\hspace{-1pt}+\hspace{-1pt}_mR^1$—
wherein $R^1$ is selected from the group consisting of alkylene and alkoxyalkylene of not more than 8 carbon atoms, $R^2$ is alkylene of not more than 4 carbon atoms, $R^3$ is selected from the group consisting of alkyl and alkenyl of not more than 4 carbon atoms and $m$ is an integer from 0 to 1, and (V) aryl, aralkyl and alkaryl of not more than 18 carbon atoms; and Y is cycloalkenyl of at least 5 and not more than 7 carbon atoms in the ring selected from the group consisting of

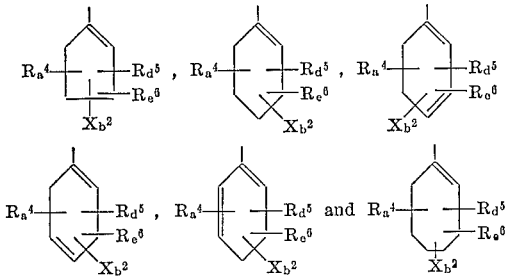

wherein $R^4$ is alkyl of not more than 4 carbon atoms, $R^5$ is alkoxy of not more than 4 carbon atoms, $R^6$ is phenyl, $X^2$ is halogen (Cl, Br, F and I), $a$, $b$ and $d$ are each integers from 0 to 3 inclusive and $e$ is an integer from 0 to 1.

The N-(cycloalken-1-yl) α-haloacetamides of this invention contain unsaturation in the alkenyl ring at the ring carbon atom through which the ring is bonded to the nitrogen atom. When the cycloalkenyl is a six-membered ring the ring system can be conjugated, but one unsaturation must be at the ring carbon atom through which the ring is bonded to the nitrogen atom, i.e., the 1 or 6 position.

In the above formula, the alkylene portion of $R^1$ can be straight or branched. Preferably, the alkylene portion of $R^1$ is of at least 2 carbon atoms, and said carbon atoms are between the nitrogen and oxygen atoms.

Representative Z radicals for the α-haloacetamides of this invention include alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologues and isomers of alkyl having 1 through 18 carbon atoms; alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologues and isomers of alkenyl having 2 through 18 carbon atoms; alkynyl such as propargyl, butynyl, pentynyl and the various homologues and isomers of alkynyl having 3 through 18 carbon atoms; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3 - dichloropentyl, 3,3 - dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-dichloromethylheptyl, chlorooctyl, bromooctyl, iodooctyl, 2,4-dichloromethylhexyl, 2,4-dichlorooctyl, 2,4,4-trichloromethylphenyl, 1,3,5-tribromooctyl and the halogenated straight and branched chain alkyl having 1 through 18 carbon atoms; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3-trichloro - n - heptenyl-5, 1,3,5-trichloro-n-octenyl-6, 2,3,3-trichloromethylpentenyl-4 and the various homologues and isomers of haloalkenyl having 2 through 18 carbon atoms; haloalkynyl such as chloropropargyl, bromopropargyl, 2-chlorobutynyl-1, 4-bromobutynyl-2, chloropentynyl and the various homologues and isomers of haloalkynyl having 3 through 18 carbon atoms; cycloalkyl, alkylcycloalkyl and alkoxycycloalkyl such as cyclopentyl, 3-methylcyclopentyl, 5-methylcyclopentyl, 3,4-dimethylcyclopentyl, 2,5-dimethylcyclopentyl, 5-methoxycyclopentyl, 3,4 - dimethylcyclopentyl, 5-(tert-butyl)-cyclopentyl, 1-cyclohexyl, 3-methylcyclohexyl, 3,4 - dimethylcyclohexyl, 6 - methoxycyclohexyl, 2,4-dimethylcyclohexyl, 3-methylcyclohexyl, 3,4-dimethoxycyclohexyl, 2,6-dimethylcyclohexyl, 3,3-dimethylcyclohexyl, 6-tert-butyl)-cyclohexyl, cycloheptyl, 3-methylcycloheptyl, 3,4-dimethylcycloheptyl, 7 - methylcycloheptyl, 4,5 - dimethylcycloheptyl, 2 - methoxycycloheptyl, 6-methylcycloheptyl, 7-methylcycloheptyl, 7-(tert-butyl)-cycloheptyl, 3,4-diisopropylcycloheptyl, cyclooctyl, 3,4-dimethylcyclooctyl, 4-methoxycyclooctyl and the like; alkoxyalkyl, alkenoxyalkyl, alkoxyalkoxyalkyl, alkenoxyalkoxyalkyl, dialkoxyalkyl, alkenoxy(alkoxy)alkyl, alkenoxyalkoxy(alkoxy)alkyl and alkoxyalkoxy(alkoxy)alkyl such as methoxyethyl, 2-ethoxyethyl, 3-propoxypropyl, 4-methoxybutyl, 4-butoxybutyl, 2-allyloxyethyl, 2-butenoxyethyl, 4-butenoxybutyl, 2 - (2 - methoxyethoxy)ethyl, 2-(2-butoxyethoxy)ethyl, 4 - (3 - methoxypropoxy)butyl, 2-(3-allyloxypropoxy)ethyl, 2-(2-butenoxyethoxy)ethyl, 4,4-dimethoxybutyl, 2,2 - diethoxyethyl, 2,4 - dimethoxybutyl, 4,4-diethoxybutyl, 2-methoxy-4-allyloxybutyl, 2-ethoxy-2-propenoxyethyl, 4-(2 - allyloxyethoxy)-2-methoxybutyl, 2 -(4-methoxybutoxy)-2-methoxyethyl, 4-(2-methoxyethoxy)-4-butoxybutyl and the like, and aryl, alkaryl and aralkyl such as phenyl, tolyl, ethylphenyl, butylphenyl, xylyl, t-butylphenyl, trimethylphenyl, diethylphenyl, diphenylmethyl, naphthyl, biphenyl, benzyl, phenylethyl and the like.

Representative Y cycloalkenyl radicals for the α-chloroacetamides of this invention include by way of example 1-cyclopentenyl,
3-methyl-1-cyclopentenyl,
5-methoxy-1-cyclopentenyl,
3,4-dimethyl-1-cyclopentenyl,
3-methoxy-4-methyl-1-cyclopentenyl,
2,5-dimethoxy-1-cyclopentenyl,
5-methyl-5-cyclopentenyl,
3,4-dichloro-5-cyclopentenyl,
5-(tert-butyl)-1-cyclopentenyl,
1-cyclohexenyl,
3-methyl-1-cyclohexenyl,
3,4-dimethyl-1-cyclohexenyl,
6-methoxy-1-cyclohexenyl,
2,4-dimethyl-1-cyclohexenyl,
3-methyl-6-cyclohexenyl,
3,4-diethoxy-6-cyclohexenyl,
2,6-dichloro-1-cyclohexenyl,
3,3-dimethyl-1-cyclohexenyl,
6-phenyl-1-cyclohexenyl,
1,3-cyclohexadienyl,
3-methyl-1,3-cyclohexadienyl,
3,4-dimethoxy-1,3-cyclohexadienyl,
6-methyl-1,3-cyclohexadienyl,
2,4-dimethyl-1,3-cyclohexadienyl,
3-methyl-4,6-cyclohexadienyl,
3,4-dichloro-4,6-cyclohexadienyl,
2,6-dimethyl-4,6-cyclohexadienyl,
5,5-dimethyl-1,3-cyclohexadienyl,
6-phenyl-1,3-cyclohexadienyl,
3,5,5-trimethyl-1,3-cyclohexadienyl,
1,4-cyclohexadienyl,
3-methyl-1,4-cyclohexadienyl,
3,4-dibutoxyl-1,4-cyclohexadienyl,
6-methyl-1,4-cyclohexadienyl,
2,4-dimethyl-1,4-cyclohexadienyl,
2,6-dibromo-1,4-cyclohexadienyl,
2,5-dimethyl-1,4-cyclohexadienyl,
6-(tert-butyl)-1,4-cyclohexadienyl,
3,6,6-trimethyl-1,4-cyclohexadienyl,
3-methyl-3,6-cyclohexadienyl,
6-methyl-3,6-cyclohexadienyl,
2,6-dimethyl-3,6-cyclohexadienyl,
2,5,5-trimethoxy-3,6-cyclohexadienyl, 3,5,5-trimethyl-3,6-cyclohexadienyl,
2,4-dichloro-3,6-cyclohexadienyl,
6-(tert-butyl)-3,6-cyclohexadienyl,
1,5-cyclohexadienyl,
3-methyl-1,5-cyclohexadienyl,
3,4-dimethyl-1,5-cyclohexadienyl,
6-isopropyl-1,5-cyclohexadienyl,
6-tert-butyl-1,5-cyclohexadienyl,
2,6-dimethyl-1,5-cyclohexadienyl,
3-phenyl-2,6-cyclohexadienyl,
2,5,5-triethyl-2,6-cyclohexadienyl,
3,5,5-trimethyl-2,6-cyclohexadienyl,
6-(tert-butyl)-2,6-cyclohexadienyl,
6-methyl-2,6-cyclohexadienyl,
1-cycloheptenyl,
3-phenyl-1-cycloheptenyl,
3,4-dimethyl-1-cycloheptenyl,
7-methyl-1-cycloheptenyl,
4,5-dimethyl-1-cycloheptenyl,
2-methoxy-1-cycloheptenyl,
6-methyl-1-cycloheptenyl,
7-chloro-7-cycloheptenyl,
7-(tert-butyl)-1-cycloheptenyl and
3,4-diisopropyl-1-cycloheptenyl.

The present N-(cycloalken-1-yl) α-chloroacetamides are prepared by a process which comprises reacting a haloacetyl halide with an imine of the formula Z—N=A wherein Z is as defined above and A is selected from the group consisting of

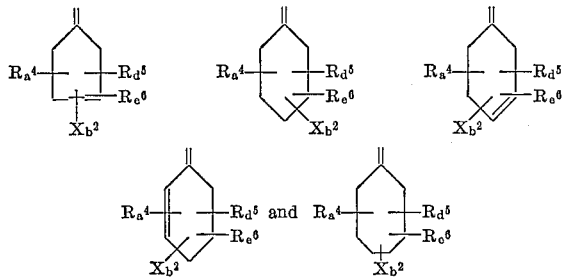

wherein $R^4$, $R^5$, $R^6$, $X^2$, $a$, $b$, $d$ and $e$ are as defined above.

The synthesis of the present compounds can be set forth as follows:

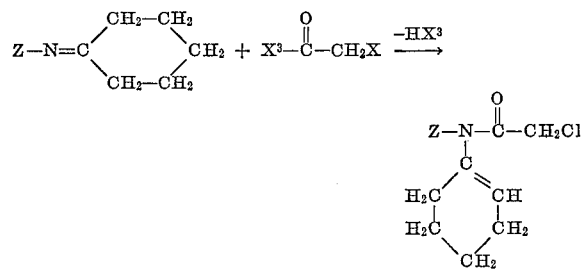

wherein Z and X are as defined above and $X^3$ is Cl, Br or I.

The reaction of the haloacetyl halides with imines in accordance with this invention can be carried out in various ways. Normally it is desired for maximum yield that the imine be present in at least an equimolar amount to the haloacetyl halide and preferably in excess of equimolar amount. The reaction is suitably carried out at room temperature, i.e. about 20–25° C. However, higher or lower temperatures can be used, the temperature not being critical. For example, temperatures above about 40° C. are generally employed when no acid acceptor is used.

The reaction is preferably carried out in the presence of an acid acceptor and an inert organic medium. The acid acceptor is generally present in at least equimolar amounts based on the amount of hydrogen halide formed in the reaction. Suitable acid acceptors, e.g. alkaline-acting or basic materials capable of binding the acid evolved in the reaction are the tertiary amines such as trimethylamine, triethylamine, pyridine, quaternary ammonium hydroxides, N-ethylmorpholine and the like; inorganic bases such as sodium hydroxide and potassium hydroxide, sodium carbonate and the like. An excess of imine reactant also serves as an acid acceptor.

Inert organic media which can be used in the practice of this invention include by way of example hydrocarbons such as benzene, toluene, xylene, cyclohexane, methylcyclohexane, n-heptane, n-hexane and the like; ethers such as isopropyl ether, n-butyl ether, 1,4-dioxane, isobutyl ether, diethyl ether and the like; aliphatic and cycloaliphatic ketones such as methyl isopropyl ketone, methyl isobutyl ketone, methyl isoamyl ketone, diisopropyl ketone, cyclohexanone and the like; and organic halides such as carbon tetrachloride, n-butyl chloride, ethylene dichloride, tetrachloroethylene and the like.

The separation of the resulting reaction product from the reaction mixture is readily accomplished. For example the salt, such as a tertiary amine hydrochloride salt formed during the reaction because of the presence of a tertiary amine compound therein as an acid acceptor, is separated from the product containing reaction mixture by simple means such as filtration and the solvent is removed from the resulting filtrate by stripping or distillation, preferably low temperature vacuum distillation. The product can be purified by any of the conventional means well known in the art, e.g. fractional distillation under reduced pressure, selective extraction, fractional distillation using a carrier gas or any suitable combination of these. If desired the product can be subjected to film distillation, recrystallization or a combination of both for further purification.

The N-(cycloalken-1-yl) α-haloacetamides of this invention are liquid or crystalline solid materials which are insoluble in water but somewhat soluble in many organic solvents such as alcohols, ketones, benzene, toluene, xylene, hexane or the like.

While the present N-(cycloalken-1-yl) α-haloacetamides are useful as fungicides, insecticides, nematocides, bactericides, bacteriostats, and fungistats, their most outstanding characteristic is the regulation of plant growth. In accordance with this invention it has been found that the growth of dormant seeds, germinant seeds, germinative seeds, emerging seedlings, established woody and herbaceous vegetation and aquatic plants can be modified by exposing the seeds, emerging seedlings, or the roots or above-ground portions of established vegetation, or the aquatic plants to the action of an effective amount of any N-(cycloalken-1-yl) α-haloacetamide of the present invention. The N-(cyclohexen-1-yl) α-haloacetamides can be used as individual compounds, as admixtures of two or more compounds, or in admixture with an adjuvant. These compounds are effective as general plant growth regulants, including post-emergent phytotoxicants and pre-emergent phytotoxicants, but their most outstanding utility is as selective pre-emergent phytotoxicants, e.g. the selective control of the growth of one or more monocotyledonous species and/or one or more dicotyledonous species in the presence of other monocotyledons and/or dicotyledons. Furthermore, these compounds are characterized by broad spectrum activity; i.e. they modify the growth of a wide variety of plants including but not limited to ferns, conifers (pine, fir and the like), aquatic, monocotyledons and dicotyledons.

For the sake of brevity and simplicity, the term "active ingredient" will be used hereinafter to describe the present N-(cycloalken-1-yl) α-haloacetamides.

The plant growth regulant compositions of this invention contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided solid, a liquid of organic origin, water, a wetting agent, a dispersing agent, an emulsifying agent or any suitable combination of these.

Typical finely divided carriers and extenders for the plant growth regulant compositions of this invention include by way of example the talcs, clays, pumice, silica, diatomaceous earth, walnut flour, chalk, quartz, fuller's earth, salt, sulfur, powdered cork, powdered wood, charcoal, ground corn cobs, illite clay, tobacco dust, volcanic ash, cottonseed hulls, wheat flour, soybean flour, tripoli and the like. Typical liquid diluents include water, kerosene, Stoddard solvent, hexane, toluene, benzene, acetone, ethylene dichloride, xylene, alcohols, diesel oil, glycols and the like.

The plant growth regulant compositions of this invention, particularly liquids and wettable particles, usually contain as a conditioning agent one or more surface-active agents in amounts sufficient to render a given composition readily dispersible in water or in oil. By the term "surface-active agent" it is understood that wetting-agents, dispersing agents, suspending agents and emulsifying agents are included therein.

The term "plant growth regulant composition" as used herein and in the appended claims is intended to mean not only compositions in a suitable form for application but also concentrated compositions which require dilution or extension with a suitable quantity of liquid or solid adjuvant prior to application.

The following examples will illustrate the invention. In the following examples as well as in the specification and appended claims, parts and percent are by weight unless otherwise indicated.

EXAMPLE 1

This example describes the preparation of

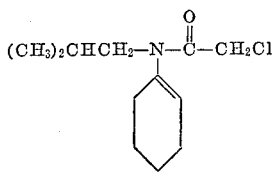

N-(1-cyclohexen-1-yl) N-(isobutyl) α-chloroacetamide.

Into a solution of 33.9 parts of chloroacetyl chloride in 200 parts of benzene maintained at a temperature of about 5° C. are added slowly with stirring 45.9 parts of N-cyclohexylidene N-isobutyl amine. After stirring for an additional 30 minutes at about 5° C., 30.3 parts of triethyl amine are added. The reaction mixture is allowed to warm to about 25° C. and is stirred for one hour. The reaction mixture is then filtered to remove the amine salts and the filtrate is washed twice with water. The benzene is removed by evaporation and the residue is fractionally distilled to obtain the product fraction boiling in the range of 130° C. to 134° C., at a pressure of 3 mm. of mercury. The product amounts to 36.1 parts of oily liquid and the structure is confirmed by nuclear magnetic resonance (NMR) spectrum analysis.

Calc'd for $C_{12}H_{20}NOCl$ (percent): C, 63.0; H, 8.74; Cl, 15.50. Found (percent): C, 63.63; H, 8.85; Cl, 15.39.

EXAMPLE 2

This example describes the preparation of

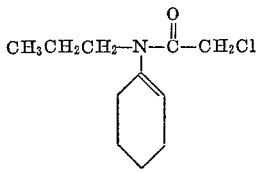

N-(1-cyclohexen-1-yl) N-(n-propyl) α-chloroacetamide.

Into a solution of 33.9 parts of chloroacetyl chloride in 250 parts of benzene maintained at a temperature of about 5° C. are added slowly with stirring 41.7 parts of N-cyclohexylidene N-(n-propyl) amine. After stirring for an additional 30 minutes at about 5° C., 30.3 parts of triethyl amine are added and the reaction mixture is allowed to warm to about 25° C. The reaction mixture is stirred for one hour at 25° C., filtered, washed twice with water and the benzene removed by evaporation. The residue is fractionally distilled to obtain the product fraction boiling in the range of 125° C. to 126° C., at a pressure of 3 mm. of mercury. This fraction is dissolved in hexane and recrystallized to obtain 37.8 parts of solid product having a M.P. of 45–47° C. The structure is confirmed by NMR spectrum analysis.

Calc'd for $C_{11}H_{18}NOCl$ (percent): C, 61.40; H, 8.37; Cl, 16.50. Found (percent): C, 61.54; H, 8.50; Cl, 16.08.

EXAMPLE 3

This example describes the preparation of

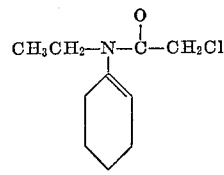

N-(1-cyclohexen-1-yl) N-(ethyl) α-chloroacetamide.

Into a solution of 33.9 parts of chloroacetyl chloride in 250 parts of benzene maintained at a temperature of about 5° C. are added slowly with stirring 37.5 parts of N-cyclohexylidene ethylamine. After stirring for an additional 30 minutes at about 5° C., 30.3 parts of triethyl amine are added and the reaction mixture is allowed to warm to about 25° C. The reaction mixture is stirred for one hour at 25° C., filtered, washed twice with water and the benzene removed by evaporation. The residue is fractionally distilled to obtain the product fraction boiling in the range of 115° C. to 120° C., at a pressure of 2 mm. of mercury. This fraction is dissolved in hexane and recrystallized to obtain 37.4 parts of solid product having a M.P. of 27–28° C. The structure is confirmed by NMR spectrum analysis.

Calc'd for $C_{10}H_{16}NOCl$ (percent): N, 6.98; Cl, 17.65; m.w., 201. Found (percent): N, 7.30; Cl, 18.20; m.w., 200.

EXAMPLE 4

This example describes the preparation of

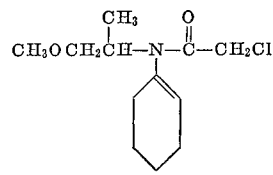

N-(1-cyclohexen-1-yl) N-(2-methoxyisopropyl) α-chloroacetamide.

Into a solution of 22.4 parts of chloroacetyl chloride in 150 parts of benzene maintained at a temperature of about 5° C. are added with stirring 34 parts of N-cyclohexylidene N-(2-methoxyisopropyl)amine. After stirring for an additional 30 minutes, 20.2 parts of triethyl amine are added and the reaction mixture is allowed to warm to about 25° C. The reaction mixture is stirred for one hour at 25° C., filtered, washed twice with water and the benzene removed by evaporation. The residue is fractionally distilled to obtain the product fraction boiling in the range of 146° C. to 150° C., at a pressure of 2 mm. of mercury. The product fraction amounts to 24.1 parts of an oily liquid and has the assigned structure.

Calc'd for $C_{12}H_{19}O_2NCl$ (percent): Cl, 14.4; N, 5.7. Found (percent): Cl, 14.19; N, 5.94.

EXAMPLE 5

This example describes the preparation of

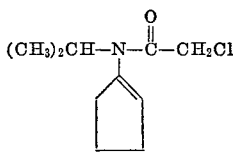

N-(1-cyclopenten-1-yl) N-(isopropyl) α-chloroacetamide.

Into a solution of 22.6 parts of chloroacetyl chloride in benzene maintained at a temperature of about 5° C. are added with stirring 25 parts of N-cyclopentylidene N-isopropyl amine. After stirring for an additional 30 minutes, 20 parts of triethyl amine are added. The reaction mixture is filtered, washed with water and the filtrate dried over MgSO$_4$. The residue is fractionally distilled to obtain the product fraction boiling in the range of 120° C. to 122° C., at a pressure of 2 mm. of mercury. The product amounts of 12.5 parts and the assigned structure is confirmed by NMR spectrum analysis.

Calc'd for C$_{10}$H$_{16}$NOCl (percent): Cl, 17.7; N, 6.95. Found (percent): Cl, 19.20; N, 7.05.

EXAMPLE 6

This example describes the preparation of

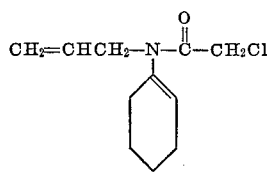

N-(1-cyclohexen-1-yl) N-(2-propen - 1 - yl) α - chloroacetamide.

Into a solution of 33.9 parts of chloroacetyl chloride in 250 parts of benzene maintained at a temperature of about 5° C. are added with stirring 41 parts of N-(cyclohexylidene) N-(2-propen-1-yl) amine. After stirring for an additional 30 minutes, 30.3 parts of triethyl amine are added and the reaction mixture is allowed to warm to about 25° C. The reaction mixture is stirred for one hour at 25° C., filtered, washed twice with water and the benzene removed by evaporation. The residue is fractionally distilled to obtain the product fraction boiling at 136° C., at a pressure of 2 mm. of mercury. The product amounts to 37.7 parts and the assigned structure is confirmed by NMR spectrum analysis.

Calc'd for C$_{11}$H$_{16}$NOCl (percent): C, 62.0; H, 7.52; Cl, 16.65. Found (percent): C, 61.4; H, 7.29; Cl, 16.73.

EXAMPLE 7

This example describes the preparation of

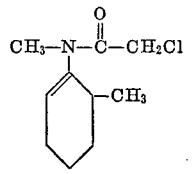

N-(2-methyl-6-cyclohexen - 1 - yl) N - methyl α - chloroacetamide.

Into a solution of 5.6 parts of chloroacetyl chloride in 250 parts of benzene maintained at a temperature of about 5° C. are added slowly with stirring 7.2 parts of N-(2-methylcyclohexylidene) N-methyl amine. After stirring for an additional 30 minutes at about 5° C., 6.9 parts of triethyl amine are added and the reaction mixture is heated at reflux for about 1 hour. The reaction mixture is cooled, filtered, washed with water and the benzene removed by evaporation. The residue is fractionally distilled to obtain the product fraction boiling in the range of 125° C. to 130° C., at a pressure of 1 mm. of mercury. This fraction is dissolved in hexane and recrystallized to obtain a solid product having a M.P. of 36–38° C. The assigned structure is confirmed by NMR spectrum analysis.

Calc'd for C$_{10}$H$_{16}$NOCl (percent): C, 59.50; H, 7.95; Cl, 17.70; N, 6.95. Found (percent) C, 59.50; H, 7.89; Cl, 17,84; N, 7.06.

EXAMPLE 8

This example describes the preparation of

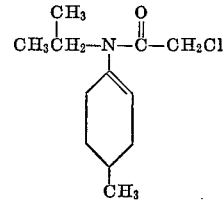

N-(4-methyl-1-cyclohexene-1-yl) N-isopropyl α - chloroacetamide.

Into a solution of 36.8 parts of chloroacetyl chloride in 250 parts of benzene are added with stirring 100 parts of N-(4-methylcyclohexylidene) N-isopropyl amine. The reaction mixture is allowed to warm to about 50° C. and is stirred for 3 hours. The reaction mixture is filtered, washed with water and the benzene removed by evaporation. The residue is fractionally distilled to obtain the product fraction, 36.6 parts, having a boiling point of 150° C., at a pressure of 1.5 mm. of mercury. The assigned structure of the product oil is confirmed by NMR spectrum analysis.

Calc'd for C$_{12}$H$_{21}$NOCl (percent): N, 6.09; Cl, 15.4. Found (percent): N, 6.07; Cl, 15.35.

EXAMPLE 9

This example describes the preparation of

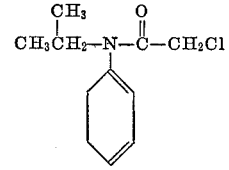

N-(1,3-cyclohexadien-1-yl) N-isopropyl α-chloroacetamide.

Into a solution of 22.4 parts of chloroacetyl chloride in 250 parts of benzene maintained at a temperature of about 5° C. are added slowly with stirring 27.6 parts of N-(3 - cyclohexen - 1-ylidene) N-isopropyl amine. After stirring for an additional 30 minutes at about 5° C., 8.6 parts of triethyl amine are added and the reaction mixture is allowed to warm to about 25° C. The reaction mixture is filtered, washed twice with water and the benzene removed by evaporation. The residue is fractionally distilled to obtain the product fraction boiling in the range of 125° C. to 129° C., at a pressure of 1 mm. of mercury. This fraction is dissolved in hexane and recrystallized to obtain the white solid product having a M.P. of 34–36° C. The assigned structure is confirmed by NMR spectrum analysis.

Calc'd for C$_{11}$H$_{17}$NOCl. (percent): N, 6.56; Cl, 16.7. Found (percent): N, 6.63; Cl, 16.52.

EXAMPLE 10

This example describes the preparation of (a) 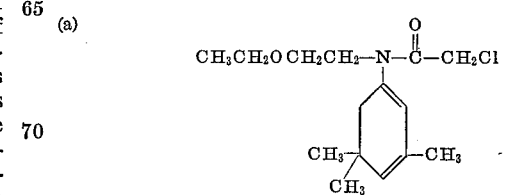

N-(3,5,5-trimethyl-1,3 - cyclohexadien-1-yl) N-(ethoxyethyl) α-chloroacetamide (b) 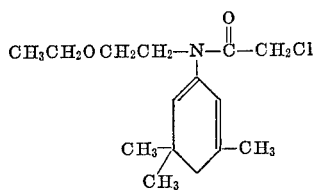

N-(3,5,5-trimethyl - 2,6 - cyclohexadien-1-yl) N-ethoxyethyl α-chloroacetamide, and (c) 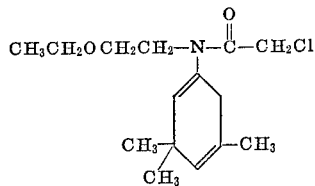

N-(3,5,5-trimethyl-3,6 - cyclohexadien - 1 - yl) N-ethoxyethyl α-chloroacetamide Into a solution of 11.3 parts of chloroacetyl chloride in 150 parts of benzene maintained at a temperature of about 5° C. are added slowly with stirring 20.9 parts of N-(3,5,5 - trimethyl - 2 - cyclohexen-1-ylidene) N-ethoxyethyl amine. After stirring for an additional 30 minutes at about 5° C., 4.3 parts of triethyl amine are added and the reaction mixture is allowed to warm to about 25° C. The reaction mixture is filtered, washed twice with water and the benzene removed by evaporation. NMR spectrum analysis shows that the residue contains the compounds represented by the formulae (a), (b) and (c) above. The residue is fractionally distilled to obtain the product fraction, 12.7 parts, having a boiling point of 135° C., at a pressure of 6 mm. of mercury. NMR spectrum analysis shows that the product is composed primarily of the compound represented by formula (a) above.

Calc'd for $C_{15}H_{24}NO_2Cl$ (percent): C, 63.20; H, 8.42; N, 4.90; Cl, 12.45. Found (percent): C, 63.33; H, 8.35; N, 4.90; Cl, 12.42.

EXAMPLE 11

This example describes the preparation of

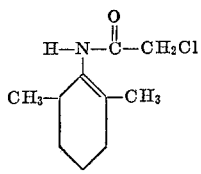

N-(2,6-dimethyl-1-cyclohexen-1-yl) α-chloroacetamide.

A reaction vessel is charged with 11.3 parts of chloroacetyl chloride, 150 parts of chlorobenzene and 25 parts of N-2,6-dimethylcyclohexylidene amine. The reaction mixture is refluxed for several hours, cooled and filtered to obtain 13.5 parts of solid product, M.P. 114–115° C.

Calc'd for $C_{10}H_{17}O\,NCl$ (percent): Cl, 17.55; N, 6.93. Found (percent): Cl, 17.86; N, 7.02.

EXAMPLE 12

This example describes the preparation of

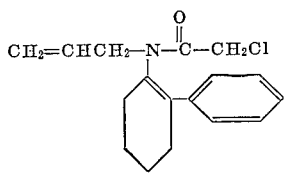

N-(2-phenyl-1-cyclohexen-1-yl) N-(2 - propen-1-yl) α-chloroacetamide

A reaction vessel was charged with 6.8 parts of chloroacetyl chloride, 150 parts of chlorobenzene and 12.8 parts of N-2-phenylcyclohexylidene N-(2 - propen-1-yl)amine.

The reaction mixture is heated at reflux for about 3 hours, cooled and the chlorobenzene removed by evaporation under vacuum. The residue is fractionally distilled to obtain the product fraction boiling at 186° C. at a pressure of 1 to 2 mm. of mercury. The product fraction amounts to 12.4 parts and has the assigned structure.

Calc'd for $C_{17}H_{20}O\,NCl$ (percent): Cl, 12.3; N, 4.85. Found (percent): Cl, 12.37; N, 4.98.

Following the procedure of the foregoing examples and using the appropriate haloacetyl halide and the appropriate imine compound, the following N-(cycloalken-1-yl) α-haloacetamides are prepared.

| Exam. | |
|---|---|
| 13 | N-(1-cyclohexen-1-yl) N-(methoxyethyl) α-chloroacetamide. |
| 14 | N-(1-cyclopenten-1-yl) N-(ethoxyethyl) α-chloroacetamide. |
| 15 | N-(3-methylcyclohexen-1-yl) N-(isopropyl) α-chloroacetamide. |
| 16 | N-(1-cyclohexen-1-yl) N-(cycloheptyl) α-chloroacetamide. |
| 17 | N-(1-cyclohexen-1-yl) N-(phenyl) α-chloroacetamide. |
| 18 | N-(1-cyclohexen-1-yl) N-(methyl) α-chloroacetamide. |
| 19 | N-(1-cyclohexen-1-yl) N-(heptyl) α-chloroacetamide. |
| 20 | N-(1-cyclohexen-1-yl) N-(methoxybutyl) α-chloroacetamide. |
| 21 | N-(1-cyclohexen-1-yl) N-(2-buten-1-yl) α-chloroacetamide. |
| 22 | N-(1-cyclopenten-1-yl) N-(n-butyl) α-chloroacetamide. |
| 23 | N-(1-cyclopenten-1-yl) N-(2-propen-1-yl) α-chloroacetamide. |
| 24 | N-(1-cyclohepten-1-yl) N-(isopropyl) α-chloroacetamide. |
| 25 | N-(1, 3-cyclohexadien-1-yl) N-(methyl) α-chloroacetamide. |
| 26 | N-(3-methyl-1-cyclopenten-1-yl) N-(methyl) α-chloroacetamide |
| 27 | N-(3, 4-dimethyl-1-cyclopenten-1-yl) N-(methyl) α-chloroacetamide. |
| 28 | N-(3, 4-dimethyl-5-cyclopenten-1-yl) N-(isopropyl) α-chloroacetamide. |
| 29 | N-[5-(tert-butyl)-1-cyclopenten-1-yl] N-(isopropyl) α-chloroacetamide. |
| 30 | N-(3-methyl-5-cyclopenten-1-yl) N-methyl α-chloroacetamide. |
| 31 | N-(3, 4-dimethyl-1-cyclohexen-1-yl) N-(isopropyl) α-chloroacetamide. |
| 32 | N-(5-methyl-1-cyclohexen-1-yl) N-(isopropyl) α-chloroacetamide. |
| 33 | N-(3, 4-dimethyl-6-cyclohexen-1-yl) N-(isopropyl) α-chloroacetamide. |
| 34 | N-(2, 4-dimethyl-1-cyclohexen-1-yl) N-(isopropyl) α-chloroacetamide. |
| 35 | N-(2, 4, 6-trimethyl-1-cyclohexen-1-yl) N-(isopropyl) α-chloroacetamide. |
| 36 | N-(2, 6-dimethyl-6-cyclohexen-1-yl) N- (isopropyl) α-chloroacetamide. |
| 37 | N-[2, 6-di(tert-butyl)-1-cyclohexen-1-yl] N-(isopropyl) α-chloroacetamide. |
| 38 | N-(3-methyl-6-cyclohexen-1-yl) N-methyl α-chloroacetamide. |
| 39 | N-(6-methyl-1, 3-cyclohexadien-1-yl) N-(isopropyl) α-chloroacetamide. |
| 40 | N-(5-methyl-4, 6-cyclohexadien-1-yl) N-(isopropyl) α-chloroacetamide. |
| 41 | N-(3-methyl-4, 6-cyclohexadien-1-yl) N-(isopropyl) α-chloroacetamide. |
| 42 | N-(3, 5-dimethyl-1, 3-cyclohexadien-1-yl) N-(isopropyl) α-chloroacetamide. |
| 43 | N-[2, 6-di(tert-butyl)-1, 3-cyclohexadien-1-yl]-N-methyl α-chloroacetamide. |
| 44 | N-(2-methyl-1, 3-cyclohexadien- -yl)-N-methyl α-chloroacetamide. |
| 45 | N-(4-methyl-1, 3-cyclohexadien-1-yl)-N-methyl α-chloroacetamide. |
| 46 | N-(3, 5-dimethyl-1, 4-cyclohexadien-1-yl)-N-methyl α-chloroacetamide. |
| 47 | N-(2, 6-dimethyl-1, 4-cyclohexadien-1-yl)-N-chloromethyl α-chloroacetamide. |
| 48 | N-(3, 3-dimethyl-1, 4-cyclohexadien-1-yl)-N-methyl α-chloroacetamide. |
| 49 | N-(6-tert-butyl-1, 4-cyclohexadien-1-yl)-N-2, 4-dichlorobutyl α-chloroacetamide. |
| 50 | N-(4-isopropyl-1, 4-cyclohexadien-1-yl)-N-methyl α-chloroacetamide. |
| 51 | N-(4-methyl-1, 4-cyclohexadien-1-yl)-N-isopropyl α-chloroacetamide. |
| 52 | N-(3-methyl-2, 6-cyclohexadien-1-yl)-N-methyl α-chloroacetamide. |
| 53 | N-(3, 5-dimethyl-2, 6-cyclohexadien-1-yl)-N-2-penten-1-yl α-chloroacetamide. |
| 54 | N-(4, 4-dimethyl-2, 6-cyclohexadien-1-yl)-N-bromomethyl α-chloroacetamide. |
| 55 | N-(6-tert-butyl-2, 6-cyclohexadien-1-yl)-N-methyl α-chloroacetamide. |
| 56 | N-(2-methyl-1-cyclohexen-1-yl)-N-ethoxyethyl α-dichloroacetamide. |
| 57 | N-(2, 6-dimethyl-1-cyclohexe -1-yl)-N-ethoxyethyl α-chloroacetamide. |
| 58 | N-(2-methyl-1-cyclohexen-1-yl)-N-ethoxyethyl α-chloroacetamide. |
| 59 | N-(2-methyl-6-n-propyl-1-cyclohexen-1-yl)-N-ethoxyethyl α-chloroacetamide. |
| 60 | N-(2, 6-diethylmethyl-1-cyclohexen-1-yl)-N-ethoxyethyl α-chloroacetamide. |
| 61 | N-(4-methyl-1-cyclohexen-1-yl)-N-ethoxyethyl α-chloroacetamide. |
| 62 | N-(2, 6-dibutyl-1-cyclohexen-1-yl)-N-ethoxyethyl α-chloroacetamide. |
| 63 | N-(2, 4, 4-trimethyl-1, 5-cyclohexadien-1-yl)-N-methyl α-chloroacetamide. |
| 64 | N-(6-tert-butyl-1, 5-cyclohexadien-1-yl)-N-methyl α-chloroacetamide. |
| 65 | N-(3-methyl-3, 6-cyclohexadien-1-yl)-N-methyl α-chloroacetamide. |

Exam.
66...... N-(2-methyl-3,6-cyclohexadien-1-yl)-N-methyl α-chloroacetamide.
67...... N-(2,5-dimethyl-3,6-cyclohexadien-1-yl)-N-methyl α-chloroacetamide.
68...... N-(6-tert-butyl-3,6-cyclohexadien-1-yl)-N-isopropyl α-chloroacetamine.
69...... N-(3,6-dimethyl-3,6-cyclohexadien-1-yl)-N-isopropyl α-chloroacetamide.
70...... N-(3-methyl-1-cyclohepten-1-yl) N-(isopropyl) α-chloroacetamide.
71...... N-(3,4-dimethyl-1-cyclohepten-1-yl) N-(isopropyl) α-chloroacetamide.
72...... N-(7-tert-butyl-1-cyclohepten-1-yl) N-(isopropyl) α-chloroacetamide.
73...... N-(3,4-diisopropyl-1-cyclohepten-1-yl) N-(isopropyl) α-chloroacetamide.
74...... N-(6-methyl-7-cyclohepten-1-yl) N-(isopropyl) α-chloroacetamide.
75...... N-(3,5-dimethyl-1-cyclohepten-1-yl) N-(isopropyl) α-chloroacetamide.
76...... N-(3,4-dichloro-1-cyclopenten-1-yl) α-chloroacetamide.
77...... N-(1-methoxy-1-cyclopenten-1-yl) α-chloroacetamide.
78...... N-(1-cyclopenten-1-yl) α-chloroacetamide.
79...... N-(3-methoxycyclohexen-1-yl) N-(isopropyl) α-chloroacetamide.
80...... N-(1-cyclohexen-1-yl) α-chloroacetamide.
81...... N-(2,4-dimethoxy-1-cyclohexen-1-yl) N-(phenyl) α-bromoacetamide.
82...... N-(2,4-dichloro-1-cyclohexen-1-yl) N-(methyl) α-bromoacetamide.
83...... N-(2,4-dibromo-1-cyclohexen-1-yl) N-(hepty.) α-bromoacetamide.
84...... N-(2-phenyl-1-cyclohexen-1-yl) N-(methoxybutyl) α-iodoacetamide.
85...... N-(2-t-butoxy-1-cyclohexen-1-yl) N-(2-buten-1-yl) α-iodoacetamide.
86...... N-(1-cyclopenten-1-yl) N-(n-butyl) α-bromoacetamide.
87...... N-(1-cyclopenten-1-yl) N-(2-propen-1-yl) α-bromoacetamide.
88...... N-(1,3-cyclohexadien-1-yl) α-chloroacetamide.
89...... N-(3-methyl-1-cyclopenten-1-yl) α-chloroacetamide.
90...... N-(3,4-dimethoxy-1-cyclopenten-1-yl) N-(methyl) α-bromoacetamide.
91...... N-(3,4-dimethoxy-5-cyclopenten-1-yl) N-(2-penten-1-yl) α-chloracetamide.
92...... N-[5-(tert-butoxy)-1-cyclopenten-1-yl] N-(isopropyl) α-chloroacetamide.
93...... N-(3-chloro-5-cyclopenten-1-yl) N-methyl α-chloroacetamide.
94...... N-(3,4-diethoxy-1-cyclohexen-1-yl) N-(isopropyl) α-chloroacetamide.
95...... N-(5-methyl-1-cyclohexen-1-yl) α-chloroacetamide.
96...... N-(3,4-dibromo-6-cyclohexen-1-yl) N-(isopropyl) α-chloroacetamide.
97...... N-(1-cyclohexen-1-yl) N-(2,2-dimethoxyethyl) α-chloroacetamide.
98...... N-(1-cyclohexen-1-yl) N-(methoxybutoxyethyl) α-chloroacetamide.
99...... N-(6-cyclohexen-1-yl) N-(allyloxyethyl) α-chloroacetamide.
100..... N-(3-phenyl-6-cyclohexen-1-yl) N-methyl α-chloroacetamide.
101..... N-(6-methoxy-1,3-cyclohexadien-1-yl) N-(isopropyl) α-chloroacetamide.
102..... N-(5-methyl-4,6-cyclohexadien-1-yl) α-chloroacetamide.
103..... N-(3-chloro-4,6-cyclohexadien-1-yl) α-chloroacetamide.
104..... N-(3,5-dimethoxy-1,3-cyclohexadien-1-yl) α-chloroacetamide.
105..... N-[2,6-di(tert-butyl)-1,3-cyclohexadien-1-yl]-N-methyl α-bromoacetamide.
106..... N-(2-methyl-1,3-cyclohexadien-1-yl)-N-methyl α-idoacetamide.
107..... N-(4-methyl-1,3-cyclohexadien-1-yl) α-chloroacetamide.
108..... N-(3,5-dibromo-1,4-cyclohexadien-1-yl)-N-4-allyloxyethoxy-4-ethoxybutyl α-chloroacetamide.
109..... N-(2,6-dibromo-1,4-cyclohexadien-1-yl)-N-cyclohexyl α-bromoacetamide.
110..... N-(3,3-dimethoxy-1,4-cyclohexadien-1-yl)-N-phenyl α-chloroacetamide.
111..... N-(6-phenyl-1,4-cyclohexadien-1-yl)-N-(benzyl) α-chloroacetamide.
112..... N-(2-methoxy-4-isopropyl-1,4-cyclohexadien-1-yl)-N-(2,4-dimethylphenyl) α-chloroacetamide.
113..... N-(2-methoxy-4-methyl-1,4-cyclohexadien-1-yl)-N-(isopropyl) α-chloroacetamide.
114..... N-(2-chloro-3-methyl-2,6-cyclohexadien-1-yl)-N-(methyl) α-chloroacetamide.
115..... N-(3,5-dimethyl-2,6-cyclohexadien-1-yl)-N-(4-butoxy-2-methoxybutyl) α-chloroacetamide.
116..... N-(2-chloro-4,4-dimethyl-2,6-cyclohexadien-1-yl)-N-(methyl) α-chloroacetamide.
117..... N-(6-tert-butyl-2,6-cyclohexadien-1-yl) α-chloroacetamide.
118..... N-(2,6-dimethyl-4-methoxy-2,6-cyclohexadien-1-yl) α-chloroacetamide.
119..... N-(2,4-dimethyl-2,6-cyclohexadien-1-yl)-N-(allyl) α-iodoacetamide.
120..... N-(3-methyl-1,5-cyclohexadien-lyl) α-chloroacetamide.
121..... N-(3,4-dimethoxy-1,5-cyclohexadien-1-yl)-N-(methyl) α-chloroacetamide.
122..... N-(5-methyl-1,5-cyclohexadien-1-yl)-N-(methoxybutoxyethyl) α-chloroacetamide.
123..... N-(4-methyl-1,5-cyclohexadien-1-yl)-N-(allyloxyethyl) α-chloroacetamide.
124..... N-(2,6-dimethyl-1,5-cyclohexadien-1-yl)-N-(2,2-diethoxyethyl) α-chloroacetamide.
125..... N-(2,4,4-triemthoxy-1,5-cyclohexadien-1-yl)-N-(methyl) α-chloroacetamide.
126..... N-(2-methoxy-3-methyl-3,6-cyclohexadien-1-yl)-N-(methyl) α-chloroacetamide.
127..... N-(2,3,6-cyclohexadien-1-yl) α-chloroacetamide.
128..... N-(2,5-dibromo-3,6-cyclohexadien-1-yl) α-chloroacetamide.
129..... N-(3-methyl-1-cyclohepten-1-yl) α-chloroacetamide.
130..... N-(3,4-dimethoxy-1-cyclohepten-1-yl)-N-(4-methylcyclohexyl) α-chloroacetamide.

Exam.
131..... N-(7-tert-butyl-1-cyclohepten-1-yl) N-(isopropyl) α-bromoacetamide.
132..... N-(3,4-dibromo-1-cyclohepten-1-yl) N-(4-methoxycyclohexyl) α-chloroacetamide.
133..... N-(2-methoxy-6-methyl-7-cyclohepten-1-yl) N-(isopropyl) α-chloroacetamide.
134..... N-(3,5-dichloro-1-cyclohepten-1-yl) N-(isopropyl) α-bromoacetamide.

The pre-emergent plant growth regulant activity of illustrative N-(1-cycloalken-1-yl) α-haloacetamides of this invention is demonstrated as follows:

A good grade of top soil is placed in aluminum pans and compacted to a depth of 3/8" to 1/2" from the top of each pan. A predetermined number of seeds of each of various plant species are placed on top of the soil in separate pans. The plant growth regulant compositions are applied to the soil by two methods: (1) application to the surface of the top soil layer and (2) admixture with or incorporation in the top soil layer.

In the surface application method the seeds are covered with a 3/8" layer of prepared soil and the pan leveled. The plant growth regulant composition is applied by spraying the surface of the top layer of soil, prior to watering the seeds, with a solution containing a sufficient amount of active ingredient to obtain the desired rate per acre on the soil surface.

In the soil incorporation method, the soil required to fill the pans is weighed and admixed with a plant growth regulant composition containing a known amount of active ingredient. The pans are then filled with the admixture and leveled. Watering is carried out by permitting the soil in the pans to absorb moisture through the apertured bottom of the pans. The seed containing pans are placed on a wet sand bench and maintained for approximately 14 days under ordinary conditions of sunlight and watering. The plants are observed at the end of approximately 14 days and the results recorded.

The pre-emergent phytotoxic activity of the active ingredients is measured by the average percent control of each seed lot. The average percent control is converted to a relative numerical scale for the sake of brevity and simplicity in the examples. The pre-emergent phytotoxic activity index used in Tables I, II and IV is defined as follows:

| Average percent control | Numerical scale |
|---|---|
| 0–25 | 0 |
| 26–50 | 1 |
| 51–75 | 2 |
| 76–100 | 3 |

The pre-emergent phytotoxic activity of some of the N-(cycloalken-1-yl) α-haloacetamides of this invention is recorded in Tables I and II for various application rates of the active ingredients in both surface and soil-incorporation applications. The terms "SA" and "SI" in the Application Method column of Tables I, II, III and IV means surface application method and soil incorporation method, respectively. In Tables I, II and IV the various plant species are represented by letters as follows:

A—General grass
B—General broadleaf
C—Morning glory
D—Wild oats
E—Brome grass
F—Rye grass
G—Radish
H—Sugar beets
I—Cotton
J—Corn
K—Foxtail
L—Barnyard grass
M—Crab grass
N—Pigweed
O—Soybean
P—Wild buckwheat
Q—Tomato
R—Sorghum
S—Rice
T—Wheat
U—Smartweed
V—Cockelbur
W—Lambsquarter
X—Coffee weed
Y—Velvet leaf

TABLE I
[Pre-emergent phytotoxic activity of various N-(cycloalken-1-yl) α-haloacetamides]

| Compound | Rate, lbs./acre | Application method | A | B | C | D | E | F | G | H | I | J | K | L | M | N | O | P | Q | R | S |
|---|---|---|---|---|---|---|---|---|---|---|---|---|---|---|---|---|---|---|---|---|---|
| N-(1-cyclohexen-1-yl)-N-isopropyl-α-chloroacetamide. | 5 | SA | 3 | 2 | 2 | 3 | 3 | 3 | 1 | 3 | | | | 3 | | 3 | 3 | 1 | 2 | 1 | 3 | |
| | 0.25 | SI | 3 | 0 | 0 | 3 | 3 | 3 | 0 | 0 | 0 | 0 | 3 | 3 | 3 | 3 | 0 | 0 | 0 | 3 | 3 |
| | 0.01 | SI | 1 | 0 | 0 | 0 | 0 | 1 | 0 | 0 | 0 | 0 | 3 | 3 | 3 | 3 | 1 | 0 | 1 | 3 | 0 |
| N-(1-cyclohexen-1-yl)-N-methyl-α-chloroacetamide. | 5 | SA | 3 | 1 | 0 | 2 | 3 | 3 | 0 | 1 | | | | 3 | | 3 | 3 | 1 | 0 | 0 | 3 | |
| | 0.25 | SI | 2 | 0 | 0 | 0 | 1 | 1 | 0 | 0 | 0 | 0 | 2 | 3 | 3 | 3 | 1 | 0 | 0 | 1 | 0 | 2 |
| N-(1-cyclohexen-1-yl)-N-ethyl-α-chloroacetamide. | 5 | SA | 3 | 2 | 2 | 3 | 3 | 3 | 2 | 3 | | | | 3 | | 3 | 3 | 1 | 2 | 1 | 3 | |
| | 0.25 | SI | 2 | 0 | 0 | 0 | 3 | 2 | 0 | 0 | 0 | 0 | 3 | 3 | 3 | 3 | 2 | 0 | | 0 | 0 | 0 |
| N-(1-cyclohexen-1-yl)-N-n-propyl-α-chloroacetamide. | 5 | SA | 3 | 1 | 0 | 3 | 3 | 3 | 1 | 1 | | | | 3 | | 3 | 3 | 1 | 0 | 0 | 3 | |
| | 0.05 | SI | 1 | 0 | 0 | 0 | 0 | 1 | 0 | 0 | 0 | 0 | 3 | 3 | 3 | 3 | 1 | 0 | 0 | 2 | 0 |
| N-(1-cyclohexen-1-yl)-N-isobutyl-α-chloroacetamide. | 5 | SA | 3 | 0 | 0 | 3 | 3 | 3 | 0 | 1 | | | | 3 | | 3 | 3 | 1 | 0 | 0 | 2 | |
| | 1 | SI | 3 | 1 | 2 | 1 | 2 | 2 | 2 | 2 | 1 | 0 | 1 | 3 | 3 | 3 | 3 | 1 | 0 | 1 | 2 | 3 |
| | 0.25 | SI | 2 | 0 | 0 | 1 | 0 | 1 | 0 | 0 | 0 | 0 | 3 | 3 | 2 | 1 | 0 | 0 | 1 | 0 | 2 |
| N-(1-cyclohexen-1-yl)-N-allyl-α-chloroacetamide. | 10 | SA | 3 | 3 | 2 | 3 | 3 | 3 | 1 | 3 | | | | 3 | | 3 | 3 | 1 | 3 | 3 | 3 | |
| | 1 | SI | 3 | 2 | 2 | 3 | 3 | 3 | 1 | 3 | 0 | 0 | 3 | 3 | 3 | 3 | 0 | 1 | 3 | 3 | 3 |
| | 0.05 | SI | 2 | 0 | 0 | 1 | 1 | 2 | 0 | 0 | 0 | 0 | 3 | 3 | 3 | 2 | 1 | 0 | 0 | 2 | 1 |
| N-(1-cyclohexen-1-yl)-N-ethoxyethyl-α-chloroacetamide. | 10 | SA | 3 | 2 | 2 | 3 | 3 | 3 | 1 | 3 | | | | 3 | | 3 | 3 | 0 | 3 | 2 | 3 | |
| | 1 | SI | 3 | 0 | 0 | 1 | 3 | 3 | 0 | 0 | 0 | 1 | 3 | 3 | 3 | 3 | 1 | 2 | 0 | 3 | 3 |
| N-(1-cyclohexen-1-yl)-N-methoxypropyl-α-chloroacetamide. | 5 | SA | 3 | 0 | 0 | 0 | 3 | 3 | 0 | 1 | | | | 3 | | 3 | 3 | 0 | 0 | 0 | 3 | |
| | 1 | SI | 2 | 0 | 0 | 3 | 3 | 3 | 0 | 1 | 0 | 0 | 3 | 3 | 3 | 0 | 0 | 0 | 0 | 2 | 1 |
| N-(1-cyclohexen-1-yl)-N-methoxyethyl-α-chloroacetamide. | 5 | SA | 3 | 2 | 1 | 2 | 3 | 3 | 1 | 3 | | | | 3 | | 3 | 3 | 0 | 1 | 2 | 3 | |
| | 1 | SI | 3 | 0 | 0 | 0 | 1 | 3 | 0 | 0 | | | | 3 | | 3 | 3 | 0 | 0 | 0 | 3 | |
| N-(1-cyclopenten-1-yl)-N-(isopropyl)-α-chloroacetamide. | 5 | SA | 3 | 1 | 0 | 2 | 2 | 3 | 0 | 1 | | | | 3 | | 3 | 3 | 2 | 0 | 0 | 1 | 2 |
| | 1 | SI | 2 | 0 | 0 | 1 | 1 | 2 | 0 | 0 | | | | 3 | | 3 | 3 | 0 | 1 | 0 | 0 | 2 |
| | 0.25 | SI | 2 | 0 | 0 | 0 | 2 | 3 | 0 | 0 | 0 | 0 | 3 | 3 | 3 | 1 | 0 | 0 | 0 | 2 | |
| N-((1-cyclohexen-1-yl)-N-(2-methoxyisopropyl)-α-chloroacetamide. | 5 | SA | 2 | 1 | 0 | 1 | 0 | 1 | 0 | 2 | | | | 3 | | 3 | 3 | 0 | 2 | 1 | 3 | |
| | 1 | SI | 3 | 0 | 0 | 1 | 3 | 3 | 0 | 1 | 1 | 0 | 3 | 3 | 3 | 3 | 1 | 0 | 3 | 3 |
| | 0.25 | SI | | | | | | 0 | 1 | | 2 | 0 | 0 | 3 | 3 | 3 | 0 | | | | | 2 |
| N-(1,3-cyclohexadien-1-yl)-N-(isopropyl) α-chloroacetamide. | 10 | SA | 3 | 2 | 1 | 3 | 3 | 3 | 1 | 2 | | | | 3 | | 3 | 3 | 0 | 2 | 1 | 3 | 3 |
| | 5 | SI | 3 | 1 | 1 | 2 | 3 | 3 | 0 | 2 | 0 | 0 | 3 | 3 | 3 | 3 | 0 | 2 | 1 | 3 | 3 |
| | 0.25 | SI | 2 | 0 | 0 | 0 | 1 | 0 | 0 | 0 | 0 | 3 | 3 | 3 | 2 | 0 | 0 | 0 | 0 | 2 |
| N-(1-cyclohepten-1-yl)-N-(isopropyl) α-chloroacetamide. | 5 | SA | 3 | 1 | 1 | 3 | 3 | 3 | 0 | 2 | | | | 3 | | 3 | 3 | 0 | 3 | 0 | 3 | |
| | 0.05 | SI | 1 | 0 | | 0 | 1 | | | | 1 | 1 | 0 | | 3 | 3 | 1 | 0 | | | | 1 |
| N-(2-methyl-6-cyclohexen-1-yl) N-methyl α-chloroacetamide. | 5 | SA | 3 | 2 | 1 | 3 | 3 | 3 | 0 | 3 | | | | 3 | | 3 | 3 | 0 | 3 | 2 | 2 | |
| | 1 | SI | 3 | 0 | 0 | 3 | 3 | 3 | 0 | 0 | 0 | 0 | 3 | 3 | 3 | 1 | 0 | 0 | 1 | 3 | 3 |

TABLE II
[Pre-emergent phytotoxic activity of various N-(cycloalken-1-yl) α-haloacetamides]

| Compound | Rate, lb./acre | Application method | D | E | H | I | J | L | M | N | O | S | T | U | V | W | X | Y |
|---|---|---|---|---|---|---|---|---|---|---|---|---|---|---|---|---|---|---|
| N-(2,6-dimethyl-1-cyclohexen-1-yl) N-(2-ethoxyethyl) α-bromoacetamide. | 0.25 | SI | 0 | 1 | 0 | 0 | 0 | 3 | 3 | 1 | 0 | 0 | 0 | 0 | 0 | 0 | 0 | 0 |
| Admixture of N-(2,5-dimethyl-1-cyclohexen-1-yl) N-(2-ethoxyethyl) α-chloroacetamide and N-(3,6-dimethyl-1-cyclohexen-1-yl) N-(2-ethoxyethyl)α-chloroacetamide. | 0.25 | SI | 1 | 3 | 0 | 0 | 1 | 3 | 3 | 3 | 1 | 3 | 1 | 2 | 0 | 3 | 0 | 0 |
| N-(2-ethyl-1-cyclohexen-1-yl) N-(2-methoxyethyl) α-chloroacetamide. | 0.25 | SI | 3 | 3 | 2 | 0 | 0 | 3 | 3 | 3 | 0 | 2 | 2 | 3 | 0 | 2 | 2 | 0 |
| N-(2,6-dimethyl-1-cyclohexen-1-yl) N-(2-ethoxyethyl) α-chloroacetamide. | 0.25 | SI | 3 | 3 | 2 | 0 | 3 | 3 | 3 | 3 | 0 | 3 | 3 | 3 | 0 | 3 | 0 | 1 |
| Admixture of N-(2-methyl-6-ethyl-1-cyclohexen-1-yl) N-(2-ethoxyethyl) α-chloroacetamide and N-(2-ethyl-6-methyl-1-cyclohexen-1-yl) N-(2-ethoxyethyl) α-chloroacetamide. | 0.25 | SI | 3 | 3 | 2 | 0 | 2 | 3 | 3 | 3 | 0 | 3 | 3 | 3 | 0 | 3 | 1 | 1 |
| N-(2,6-dimethyl-1-cyclohexen-1-yl) N-(2,2-dimethoxyethyl) α-chloroacetamide. | 0.25 | SI | 2 | 2 | 0 | 1 | 1 | 3 | 3 | 1 | 0 | 0 | 0 | 1 | 0 | 0 | 3 | 0 |
| N-(1-cyclohexen-1-yl) N-(2,2-diethoxyethyl) α-chloroacetamide. | 1.0 | SI | 0 | 0 | 0 | 0 | 1 | 3 | 0 | 0 | 0 | 0 | 0 | 0 | 0 | 0 | 0 | 0 |
| N-(2-phenyl-1-cyclohexen-1-yl) N-(2-propen-1-yl) α-chloroacetamide. | 1.0 | SA | 1 | 0 | 0 | 1 | 0 | 3 | 3 | 0 | 1 | 1 | 0 | 0 | 0 | 0 | 0 | 0 |
| N-(4-methyl-1-cyclohexen-1-yl) N-(2-propen-1-yl) α-chloroacetamide. | 0.25 | SA | 2 | 2 | 0 | 0 | 0 | 3 | 3 | 0 | 0 | 1 | 0 | 0 | 0 | 0 | 0 | 0 |
| N-(2,6-dimethyl-1-cyclohexen-1-yl) α-chloroacetamide. | 0.25 | SA | 0 | 0 | 0 | 0 | 0 | 0 | 1 | 0 | 0 | 0 | 0 | 0 | 0 | 3 | 0 | 0 |
| N-(2-ethyl-1-cyclohexen-1-yl) N-(2-propen-1-yl) α-chloroacetamide. | 0.25 | SA | 3 | 2 | 1 | 0 | 0 | 3 | 3 | 1 | 0 | 1 | 1 | 0 | 0 | 2 | 0 | 0 |
| N-(2-methyl-6-t-butyl-1-cyclohexen-1-yl) α-bromoacetamide. | 1.0 | SA | 0 | 0 | 0 | 0 | 0 | 3 | 3 | 3 | 0 | 0 | 0 | 0 | 0 | 3 | 0 | 1 |
| N-(1-cyclohexen-1-yl) N-(benzyl) α-chloroacetamide. | 1.0 | SA | 2 | 1 | 1 | 0 | 0 | 3 | 0 | 1 | 0 | 2 | 0 | 0 | 0 | 3 | 1 | 0 |
| N-(2-methoxy-4-methyl-1-cyclohexen-1-yl) N-(ethoxyethyl) α-chloroacetamide. | 1.0 | SI | 1 | 0 | 1 | 0 | 1 | 3 | 3 | 0 | 0 | 0 | 0 | 2 | 0 | 1 | 0 | 0 |

While carrying out the above and other pre-emergent tests with the active ingredients of this invention, numerous specific plant growth responses were observed and recorded. Some of the observed plant growth responses are given in Table III.

TABLE III

| Compound | Application rate and method | Plant growth response |
|---|---|---|
| N-(1-cyclohexen-1-yl) N-(ethyl) α-chloroacetamide. | 1 lb./a. (SI) | Tillering of grass species. |
| N-(1-cyclohexen-1-yl) N-(n-propyl) α-chloroacetamide. | 1 lb./a. (SI) | Do. |
| N-(1-cyclohexen-1-yl) N-(2-propyn-1-yl) α-chloroacetamide. | 5 lbs./a. (SI) | Stunting of broadleaf species. |
| N-(1-cyclohexen-1-yl) N-(3-methoxypropyl) α-chloroacetamide. | 1 lb./a. (SI) | Stunting of grass and broadleaf species. |
| N-(2-methyl-6-t-butyl-1-cyclohexen-1-yl) α-bromoacetamide. | 1 lb./a. (SI) | Stunting of broadleaf species. |
| N-(4-isopropyl-1-cyclohexen-1-yl) N-(2-propen-1-yl) α-chloroacetamide. | 1 lb./a. (SI) | Stunting of grass species. |

The lack of phytotoxic activity of α-haloacetamides which are similar to the N-(cycloalken-1-yl) α-haloacetamides of this invention is demonstrated as follows. Pre-emergent greenhouse tests are used and the seed planting procedure and application of α-haloacetamide are carried out in the same manner as in the above pre-emergent examples. Results and further details are given in Table IV. The identification of seeds, the phytotoxic activity index and application method symbols are the same as those used above.

3,574,746

TABLE IV
[Pre-Emergent phytotoxic activity of α-haloacetamides]

| Compounds | Rate, lb./acre | Application method | Plant | | | | | | | | | | | | | | | | | |
|---|---|---|---|---|---|---|---|---|---|---|---|---|---|---|---|---|---|---|---|---|
| | | | A | B | C | D | E | F | G | H | I | J | K | L | M | N | O | P | Q | R | S |
| N-(2-cyclohexen-1-yl)-N-isopropyl-α-chloro-acetamide. | 1 | SI | 0 | 0 | 0 | 0 | 0 | 0 | 1 | 1 | 0 | 0 | 2 | 3 | 1 | 0 | 0 | 2 | 1 | 0 | 0 |
| | 0.25 | SI | 0 | 0 | 0 | 0 | 0 | 0 | 0 | 0 | 0 | 0 | 0 | 2 | 0 | 2 | 0 | 0 | 1 | 0 | 0 |
| N-cyclohexyl-N-(2-methylpropenyl)acetamide. | 5 | SA | 2 | 0 | 0 | 1 | 1 | 2 | 0 | 0 | — | — | 3 | — | 3 | 3 | 0 | 0 | 0 | 1 | — |
| | 1 | SI | 1 | 0 | 0 | 0 | 0 | 1 | 0 | 0 | 0 | 0 | 2 | 2 | 2 | 1 | 0 | 0 | 0 | 0 | 1 |

The post-emergent plant growth regulant activity of various N-(cycloalken-1-yl) α-haloacetamides of this invention is demonstrated as follows. The active ingredients are applied in spray form to 21-day old specimens of many of the same plants used in the preceding pre-emergent tests. The spray is an acetone-water solution containing 0.5% active ingredient. The solution is applied to the plants in different sets of pans at a rate equal to approximately 10 pounds of active ingredient per acre. The treated plants are placed in a greenhouse and the effects Average percent control:　　　　　　　　　　　Numerical scale
0–25 ———————————————————— 0
26–50 ——————————————————— 1
51–75 ——————————————————— 2
76–99 ——————————————————— 3
100 ———————————————————— 4

The identification of the plants used is the same as in the preceding pre-emergent tests. Results and further details are given in Table V.

TABLE V
[Post emergent phytotoxic activity of various N-(cyclohexen-1-yl) α-haloacetmides]

| Compound | Observation period | Plant | | | | | | | | | | | | | | |
|---|---|---|---|---|---|---|---|---|---|---|---|---|---|---|---|---|
| | | A | B | C | D | E | F | G | H | K | M | N | O | P | Q | R |
| N-(1-cyclohexen-1-yl)-N-allyl-α-chloroacetamide | (1) | 3 | 3 | 4 | 3 | 3 | 3 | 3 | 4 | 4 | 4 | 4 | 1 | 4 | 4 | 2 |
| N-(1-cyclohexen-1-yl)-N-isobutyl-α-chloroacetamide | (1) | 2 | 2 | 2 | 1 | 2 | 3 | 4 | 3 | 4 | 4 | 3 | 1 | 3 | 4 | 3 |
| N-(1-cyclohexen-1-yl)-N-(ethyl) α-chloroacetamide | (1) | 2 | 1 | 1 | 3 | 3 | 3 | 1 | 0 | 4 | 3 | 4 | 1 | 1 | 4 | 2 |
| N-(2,6-dimethyl-1-cyclohexen-1-yl) N-(2-isopropoxyethyl) α-chloroacetamide | (1) | — | 1 | 3 | 3 | 3 | 3 | 2 | 3 | 3 | 3 | — | 2 | 2 | 3 | |
| N-(2,4-dimethyl-1-cyclohexen-1-yl) N-(2-n-propoxyethyl) α-chloroacetamide | (2) | — | 2 | 1 | 2 | 3 | 1 | 1 | 3 | 3 | 4 | — | 1 | 2 | 3 | |
| N-(3,5-dimethyl-1-cyclohexen-1-yl) N-(2-isobutoxyethyl) α-chloroacetamide | (2) | — | 2 | 1 | 1 | 1 | 1 | 2 | 2 | 2 | 4 | — | 2 | 2 | 2 | |
| Admixture of about 86.5 wt. percent N-(2-ethyl-1-cyclohexen-1-yl) N-(2-n-propoxyethyl) α-chloroacetamide and 13.5 wt. percent N-(2-ethyl-6-cyclohexen-1-yl) N-(2-n-propoxyethyl) α-chloroacetamide | (1) | — | 2 | 3 | 3 | 3 | 2 | 3 | 3 | 3 | 3 | 2 | 3 | 2 | 1 | |
| Admixture of about 78 wt. percent N-(2-n-propyl-1-cyclohexen-1-yl) N-(ethoxyethyl) α-chloroacetamide and 22 wt. percent N-(2-n-propyl-6-cyclohexen-1-yl) N-(2-ethoxyethyl) α-chloroacetamide | (2) | — | 2 | 3 | 3 | 2 | 1 | 0 | 3 | 3 | 4 | 1 | 4 | 1 | 4 | |
| Admixture of about 82 wt. percent N-(2-n-propyl-1-cyclohexen-1-yl) N-(methoxyethyl) α-chloroacetamide and 18 wt. percent N-(2-n-propyl-6-cyclohexen-1-yl) N-(2-methoxyethyl α-chloroacetamide | (2) | — | 2 | 3 | 3 | 3 | 0 | 0 | 3 | 3 | 4 | 0 | 0 | 0 | 3 | |
| N-(2-methyl-1-cyclohexen-1-yl) N-(2-methoxyisopropyl) α-chloroacetamide | (2) | — | 2 | 1 | 2 | 3 | 0 | 1 | 3 | 3 | 0 | 0 | 3 | 0 | 3 | |

[1] 2 week observation period.　　[2] 4 week observation period.

are observed and recorded after approximately 14 days or approximately 28 days, as is indicated in Table V.

The post-emergent phytotoxic activity index used in Table V is measured by the average percent control of each plant species and is defined as follows.

While carrying out the above and other post-emergent tests with the active ingredients of this invention, numerous specific plant growth responses were observed and recorded. Some of the observed plant growth responses at an application rate of 10 pounds per acre are as follows:

TABLE VI

| Compound | Plant growth response |
|---|---|
| N-(2,6-dimethyl-1-cyclohexen-1-yl) N-(2-isopropoxyethyl) α-chloroacetamide. | General stunting and formative action on all test species. Wild oat leaves enlarged in width. Radish leaves fasciated. Growth of grass species stopped at time post-emergent spray was applied. |
| N-(2,4-dimethyl-1-cyclohexen-1-yl) N-(2-n-propoxyethyl) α-chloroacetamide. | General stunting of grass and broadleaf species. |
| N-(3,5-dimethyl-1-cyclohexen-1-yl) N-(2-isobutoxyethyl) α-chloroacetamide. | Stunting of grass and broadleaf species. Formative action on radish. Morning glory terminals aborted. |
| Admixture of about 86.5 wt. percent of N-(2-ethyl-1-cyclohexen-1-yl) N-(2-n-propoxyethyl)α-chloroacetamide and 13.5 wt. percent N-(2-ethyl-6-cyclohexen-1-yl)N-(2-n-propoxyethyl)α-chloroacetamide. | General stunting and formative action including tillering of grass species. Wild oat leaves enlarged in width and dark green in color. |
| Admixture of about 78 wt. percent N-(2-n-propyl-1-cyclohexen-1-yl) N-(2-ethoxyethyl)α-chloroacetamide and 22 wt. percent N-(2-n-propyl-6-cyclohexen-1-yl)N-(2-ethoxyethyl)α-chloroacetamide. | Formative action and tillering of grass species. Auxiliary buds on morning glory aborted. Leaf curl on morning glory. |
| Admixture of about 82 wt. percent N-(2-n-propyl-1-cyclohexen-1-yl)N-(2-methoxyethyl)α-chloroacetamide and 18% N-(2-n-propyl-6-cyclohexen-1-yl)N-(2-methoxyethyl)α-chloroacetamide. | General stunting of grass and broadleaf species. Formative action including tillering of grass species. Morning glory terminals aborted. |
| N-(2-methyl-1-cyclohexen-1-yl) N-(2-methoxyisopropyl) α-chloroacetamide. | Formative action including tillering of grass species. |
| N-(1-cyclohexen-1-yl) N-(n-propyl) α-chloroacetamide. | Defoliation of soybean. |
| N-(6-bromo-1-cyclohexen-1-yl) N-(methyl) α-bromoacetamide. | Do. |
| N-(6-chloro-1-cyclohexen-1-yl) N-(methyl) α-chloroacetamide. | Do. |
| N-(1-cyclohexen-1-yl) N-(2-methoxyisopropyl) α-chloroacetamide. | Tillering of grass species. |
| N-(2-ethyl-1-cyclohexen-1-yl) α-chloroacetamide. | Defoliation of soybean. Tillering of grass species. Stunting of broadleaf species. |
| N-(1-cyclohexen-1-yl) N-(phenyl) α-chloroacetamide. | Defoliation f soybean. |
| N-(2-methyl-6-t-butyl-1-cyclohexen-1-yl) α-bromoacetamide. | Defoliation of soybean. General stunting of grass and broadleaf species. |
| N-(2,6-dimethyl-1-cyclohexen-1-yl) N-(2-methoxyethyl) α-chloroacetamide. | Defoliation of soybean. Formative action on grass and broadleaf species. |
| N-(2-methyl-1-cyclohexen-1-yl) N-(2-ethoxyethyl) α-chloroacetamide. | Tillering of grass species. Proliferation of terminal growth of morning glory. |

The aquatic plant phytotoxic activity of illustrative N-(1-cycloalken-1-yl) α-haloacetamides of this invention is demonstrated as follows, α-chloro-N-(2,6-dimethyl-1-cyclohexen-1-yl)-N-(2-ethoxyethyl) acetamide (Compound I) and α-chloro-N-(2-ethoxyethyl)-N-(2(6)-n-propyl-1-cyclohexen-1-yl) acetamide (Compound II) were added to different vessels containing aqueous inorganic nutrient media and Duckweed (Spirodela). Each active ingredient was used at a concentration of 100 p.p.m. based on the aqueous nutrient media. After 48 hours the treated Duckweed was observed and the results recorded. Untreated Duckweed remained healthy and continue to grow during the tests. The phytotoxic activitiy index used in Table VII is defined as in the above postemergent tests.

TABLE VII

Aquatic plant phytotoxic activity

| | Phytotoxic activity |
|---|---|
| Compound I | 2 |
| Compound II | 4 |

As mentioned hereinbefore the plant growth regulant compositions of this invention comprise an active ingredient and one or more adjuvants which can be solid or liquid extenders, carriers, diluents, conditioning agents and the like. Preferred plant growth regulant compositions containing the active ingredients of this invention have been developed so that the active ingredients can be used to the greatest advantage to modify the growth of plants. The preferred compositions comprise wettable powders, aqueous suspensions, dust formulations, granules, emulsifiable oils and solutions in solvents. In general, these preferred compositions can all contain one or more surface-active agents.

Surface-active agents which can be used in the phytotoxic compositions of this invention are set out, for example, in Searle U.S. Patent 2,426,417, Todd U.S. Patent 2,655,447, Jones U.S. Patent 2,412,510 and Lenher U.S. Patent 2,139,276. A detailed list of such agents is also set forth by J. W. McCutcheon in "Soap and Chemical Specialties," November 1947, page 8011 et seq., entitled "Synthetic Detergents;" "Detergents and Emulsifiers-Up to Date" (1960), by J. W. McCutcheon, Inc., and Bulletin E-607 of the Bureau of Entomolgy and Plant Quarantine of the U.S.D.A. In general, less than 50 parts by weight of the surface active agent is present per 100 parts by weight of plant growth regulant composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters petroleum sulfonates, sulfonated vegetable oils, ditertiary acetylinic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain arid) taurates.

The wettable powders compositions of the invention usually contain from about 5 to about 95 parts by weight of active ingredient, from 0.25 to 25 parts by weight of wetting agent, from about 0.25 to 25 parts by weight of dispersant and from 4.5 to about 94.5 parts by weight of inert solid extender, all parts being by weight of the total composition. Where required from about 0.1 to 2.0 parts by weight of the solid inert extender can be replaced by a corrosion inhibitor or antifoaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dust are dense finely divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silcia or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for plant growth regulant dust include micaceous talcs, pyrophyllite, dense kaolin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are animoic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil com-generally contain from about 5 to 95 parts active ingredient, about 1 to 50 parts surface active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as peformed and screened particulate attapulgite or heat expanded, particulate vermiculite, and the finely-divided clays such as kaolin clays, hydrated attapulgite or bentonitic clays. These extenders are sprayed or blended with the active ingredient to form the phytotoxic granules.

The mineral particles which are used in the granular plant growth regulant compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular plant growth regulant compositions of this invention generally contain from about 5 parts to about 30 parts by weight of N-(cycloalken-1-yl) α-haloacetamide per 100 parts by weight of clay and 0 to about 5 parts by weight of surface active agent per 100 parts by weight of particulate clay. The preferred plant growth regulant granular compositions contain from about 10 parts to about 25 parts by weight of active ingredient per 100 parts by weight of clay.

The plant growth regulant compositions of this invention can also contain other additaments, for example fertilizers, phytotoxicants, other plant growth regulants, pesticides and the like used as adjuvant or in combination with any of the abovedescribed adjuvants. Chemicals useful in combination with the active ingredients of this invention include for example triazines, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-methoxy-4-ethylamino-6-isopropylamino-s-triazine
2-chloro-4-ethylamino-6-isopropylamino-s-triazine
2-cholor-N,N-diallylacetamide
2-chloroallyl diethyldithiocarbamate
N'-(4-chlorophenoxy) phenyl-N,N-dimethylurea
isopropyl M-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
N,N-dimethyl-2,2-diphenylacetamide
6,7-dihydrodipyrido(1,2,-a:2',1'-c)-pyrazidiinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichloro-phenyl)-1-methyl-urea
N-1-naphthylphthalamic acid
1,1'-dimethyl-4,4'-bipyridinium salt
2-chloro-4,6-bis(isopropylamino)-s-triazine
2-chloro-4,6-bis(ethylamino)-s-triazine
2,4-dichlorophenyl-4-nitrophenyl ether
α,α,α-trifluoro-2,6-dinitro-N,N-dipropyl-p-toluidine
S-propyl dipropylthiocarbamate
2,4-dichlorophenoxyacetic acid
N-isopropyl-2-chloroacetanilide
2',6'-diethyl-N-methoxymethyl-2-chloroacetanilide Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the N-(1-cycloalken-1-yl) α-haloacetamides are dispersed in or on soil or plant growth media and/or applied to above ground portions of plants, or are incorporated into aquatic media in any convenient fashion. Application to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid plant growth regulant compositions to the surface of soil or to above ground portions of plants can be carried out by conventional methods, e.g. power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the plant growth regulants. The application of plant growth regulant compositions to aquatic plants is usually carried out by adding the compositions to the aquatic media in the area where control of the aquatic plants is desired.

The application of an effective amount of the N-(cycloalken-1-yl) α-haloacetamides of this invention to the soil or growth media and/or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific N-(cycloalken-1-yl) α-haloacetamide employed. In foliar treatment for the modification of vegetative growth, the active ingredients are applied in amounts from about 1 to about 50 or more pounds per acre. In applications to soil for the modification of the growth of germinant seeds, germinative seeds, emerging seedlings and established vegetation, the active ingredients are applied in amounts from about 0.001 to about 25 or more pounds per acre. In such soil applications, it is desirable that active ingredients be distributed to a depth of at least 0.2 inch. In selective pre-emergence phytotoxic applications the active ingredients are usually applied in amounts from about 0.001 to 5 pounds per acre. In applications for increasing the maturation rate of plants including increasing the sugar content of plants, e.g. sugar cane, and facilitating the defoliation of plants, e.g. cotton and soybeans, the active ingredients are applied in amounts of at least 0.1 pound per acre. In applications for stimulating the growth of plants to obtain improved yield of plant products, the active ingredients are applied in amounts of at least 0.5 pound per acre. In applications for the control of aquatic plants, the active ingredients are applied in amounts from about 0.01 parts per million to about 1000 parts per million, based on the aquatic medium. Thus the effective amount for each response can be stated in terms of the response, e.g. a plant growth regulant amount for general modification, a phytotoxic amount for overall control or selective control, a tilering amount for tillering, an amount sufficient to increase the maturation rate for responses such as defoliation, increased sugar content and the like, and a desiccating amount for desiccation. It is believed that one skilled in the art can readily determine from the teachings of this specification, including examples, the approximate application rate.

The terms "soil" and "growth media" are employed in the present specification and claims in their broadest sense to be inclusive of all conventional "soils" as defined in Webster's New International Dictionary, second edition, Unabridged (1961). Thus, the terms refer to any substance or media in which vegetation may take root and grow, and are intended to include not only earth but also compost, manure, muck, humus, sand and the like, adapted to support plant growth.

I claim:
1. Compound of the formula

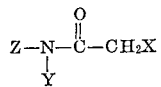

wherein X is halogen;
Z is selected from the group consisting of (I) hydrogen,
(II) $X_n^1R-$ wherein R is selected from the group consisting of alkyl having a maximum of 7 carbon atoms, and alkenyl having a maximum of 5 carbon atoms; $X^1$ is halogen and $n$ is an integer from 0 to 3 inclusive,
(III) cycloalkyl, methylcycloalkyl and methoxycycloalkyl of at least 3 and not more than 8 ring carbon atoms,
(IV) $R^3O(R^2O)_mR^1-$ wherein $R^1$ is selected from the group consiting of alkylene of not more than 4 carbon atoms, and alkoxyalkylene of not more than 8 carbon atoms, $R^2$ is alkylene of not more than 4 carbon atoms, $R^3$ is selected from the group consisting of alkyl and alkenyl of not more than 4 carbon atoms and m is an integer from 0 to 1, and
(V) phenyl, alkyl phenyl and phenylalkyl of not more than 8 carbon atoms; and Y is cycloalkenyl of at least 5 and not more than 7 carbon atoms in the ring selected from the group consisting of

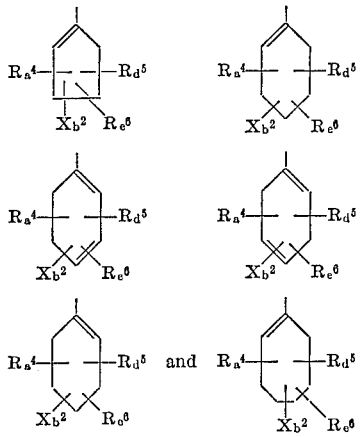

wherein $R^4$ is alkyl of not more than 4 carbon atoms, $R^5$ is alkoxy of not more than 4 carbon atoms, $R^6$ is phenyl, $X^2$ is halogen, $a$, $b$ and $d$ are each integers from 0 to 3, inclusive $e$ is an integer from 0 to 1 and the sum of $a$, $b$, $d$, $e$ is not more than 3.

2. Compound of claim 1 wherein X is chlorine and Z is represented by (II) $X_n^1R-$.

3. Compound of claim 2 wherein $n$ is 0 and R is alkyl.
4. Compound of claim 2 wherein $n$ is 0 and R is alkenyl.
5. Compound of claim 1 wherein X is chlorine and Z is represented by (IV) $R^3O+R^2O+_mR^1-$.
6. Compound of claim 5 wherein $R^1$ is ethylene.
7. Compound of claim 5 wherein (IV) is ethoxyethyl.
8. Compound of claim 5 wherein $R^1$ is ethylene, $R^3$ is alkyl and $m$ is 1.
9. Compound of claim 5 wherein $R^1$ is alkoxyalkylene, $R^3$ is alkyl and $m$ is 0.
10. Compound of claim 1 wherein Z is $R^3O+R^2O+_mR^1-$, wherein $R^3$ is alkyl, $R^1$ is ethylene and $m$ is zero, and $b$, $e$ and $d$ are zero.
11. Compound of claim 1 which is N-(4-isopropyl-1-cyclohexen-1-yl) N-(allyl) α-chloroacetamide.
12. Compound of claim 1 which is N-(2-methyl-1-cyclohexen-1-yl) N-(2-ethoxyethyl) α-chloroacetamide.
13. Compound of claim 1 which is N-(2-n-propyl-1-cyclohexen-1-yl) N-(2-ethoxyethyl) α-chloroacetamide.
14. Compound of claim 1 which is N-(1-cyclohexen-1-yl) N-(isopropyl) α-chloroacetamide.
15. Compound of claim 1 which is N-(1-cyclohexen-1-yl) N-(allyl) α-chloroacetamide.
16. Compound of claim 1 which is N-(2-isopropyl-1-cyclohexen-1-yl) N-2-ethoxyethyl α-chloroacetamide.
17. Compound of claim 1 which is N-(2,6-dimethyl-1-cyclohexen-1-yl) N-(2-ethoxyethyl) α-chloroacetamide.
18. Compound of claim 1 which is N-(2-methyl-6-n-propyl-1-cyclohexen-1-yl) N-(2-ethoxyethyl) α-chloroacetamide.
19. Compound of claim 1 which is N-(2-methyl-6-ethyl-1-cyclohexen-1-yl) N-(2-ethoxyethyl) α-chloroacetamide.
20. Compound of claim 1 which is N-(2,6-diethyl-1-cyclohexen-1-yl) N-(2-ethoxyethyl) α-chloroacetamide.
21. Compound of claim 1 which is N-(2-ethyl-1-cyclohexen-1-yl) N-(2-methoxyethyl) α-chloroacetamide.
22. Compound of claim 1 which is N-(2,6-dimethyl-1-cyclohexen-1-yl) N-(2-methoxyethyl) α-chloroacetamide.
23. Compound of claim 1 which is 2-chloro-N-(2-ethoxyethyl) - N-(2-n-propyl-6-methyl-1-cyclohexan-1-yl) acetamide.
24. Compound of claim 1 which is N-(2-n-butoxyethyl)-N-(2,6-dimethyl-1-cyclohexen-1-yl)acetamide.

References Cited
UNITED STATES PATENTS
3,268,324  8/1966  Hamm et al. _____ 71—2.3

ALEX MAZEL, Primary Examiner
J. A. NARCAVAGE, Assistant Examiner

U.S. Cl. X.R.
71—3, 54, 58, 61, 66, 67, 70, 76, 77, 92, 93, 94, 100, 105, 113, 115, 118; 260—562

UNITED STATES PATENT OFFICE
CERTIFICATE OF CORRECTION

Patent No. 3,574,746　　　　　　Dated　April 13, 1971

Inventor(s)　John P. Chupp

It is certified that error appears in the above-identified patent and that said Letters Patent are hereby corrected as shown below:

Column 1, line 14, "Compounds" should read -- Compound -- the structural formula in both column 1, lines 15-19 and in column 2, lines 55-59 should read

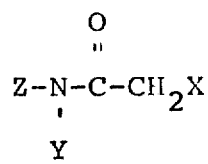

Column 3, line 63, "romethylphenyl" should read
-- romethylpentyl --. Column 4, line 7, "6-tert." should read
-- 6-(tert --. Column 8, the structural formula in EXAMPLE 3 should have

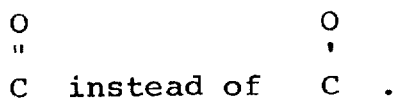

Column 12, the name of Exam. 56 should have -- α-chloro -- instead of " α-dichloro". Column 13, the name of Exam. 83 should have -- heptyl -- instead of "hepty"; and the name of Exam. 12 should have -- cyclohexadien-1-yl -- instead of "cyclohexadien-lyl". Columns 17 and 18, the title of TABLE V should have -- haloacetamides -- instead of "haloacet mides". Columns 17 and 18, the last line of the name of the next to last compound in TABLE V should have -- ) -- after "methoxyethyl". Columns 17 and 18, the Plant growth response of the fourth compound from the bottom of TABLE VI should have -- of -- instead of "f". Column 19, line 68, "arid" should read
-- acid --. Column 20, line 56, "com-" should read
-- compositions --. Column 21, the fifth compound in the list should have -- chloro -- instead of "cholor". Claim 23, the next to last word should read -- cyclohexen-1-yl -- instead of "cyclohexan-1-yl".

Signed and sealed this 26th day of October 1971.

(SEAL)
Attest:

EDWARD M. FLETCHER, JR.　　　　　ROBERT GOTTSCHALK
Attesting Officer　　　　　　　　Acting Commissioner of Patents